(12) United States Patent
Cohen et al.

(10) Patent No.: US 12,670,109 B1
(45) Date of Patent: *Jun. 30, 2026

(54) INPUT/OUTPUT (I/O) REGISTER REFLECTED IN CPU MEMORY

(71) Applicant: Amazon Technologies, Inc., Seattle, WA (US)

(72) Inventors: Jonathan Cohen, Hod Hasharon (IL); Said Bshara, Tira (IL); Leah Shalev, Zichron Yaakov (IL); Erez Izenberg, Tel Aviv (IL); Rotem Shaanan, Sal'it (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,875

(22) Filed: Jul. 10, 2024

Related U.S. Application Data

(63) Continuation of application No. 17/039,125, filed on Sep. 30, 2020, now Pat. No. 12,056,067.

(51) Int. Cl.
| | |
|---|---|
| *G06F 13/16* | (2006.01) |
| *G06F 9/30* | (2018.01) |
| *G06F 13/28* | (2006.01) |
| *G06F 15/173* | (2006.01) |
| *G06F 15/78* | (2006.01) |

(52) U.S. Cl.
CPC ...... *G06F 13/1673* (2013.01); *G06F 9/30101* (2013.01); *G06F 13/161* (2013.01); *G06F 13/1642* (2013.01); *G06F 13/28* (2013.01); *G06F 15/17375* (2013.01); *G06F 15/7807* (2013.01)

(58) Field of Classification Search
CPC .. G06F 13/1673; G06F 13/28; G06F 13/1642; G06F 13/161; G06F 9/30101; G06F 15/17375; G06F 15/7807
See application file for complete search history.

(56) References Cited

U.S. PATENT DOCUMENTS

| | | | |
|---|---|---|---|
| 2017/0322897 A1* | 11/2017 | Benisty | ................... G06F 13/37 |
| 2019/0138209 A1* | 5/2019 | Benisty | .............. G06F 12/0238 |

OTHER PUBLICATIONS

U.S. Appl. No. 17/039,125, "Advisory Action," Aug. 11, 2023, 4 pages.

(Continued)

*Primary Examiner* — Ernest Unelus
(74) *Attorney, Agent, or Firm* — Kilpatrick Townsend & Stockton LLP

(57) ABSTRACT

Systems and methods are provided to reduce the latency in accessing an input/output (I/O) hardware register by software executing on a central processing unit (CPU). The hardware register is located in a controller coupled to the CPU via an I/O bus. The CPU software can send a command to the controller for execution. The controller can execute the command and update the hardware register to indicate that the command has been executed. The controller can write contents of the hardware register to a specified address in a CPU memory that is assigned by the CPU software. The CPU software can read the specified address to determine that the command has been executed instead of reading the hardware register on the I/O bus.

20 Claims, 10 Drawing Sheets

(56)  References Cited

OTHER PUBLICATIONS

U.S. Appl. No. 17/039,125, "Final Office Action," Jun. 2, 2023, 12 pages.

U.S. Appl. No. 17/039,125, "Non-Final Office Action," Dec. 6, 2022, 11 pages.

U.S. Appl. No. 17/039,125, "Non-Final Office Action," Nov. 8, 2023, 15 pages.

U.S. Appl. No. 17/039,125, "Notice of Allowance," Apr. 12, 2024, 13 pages.

* cited by examiner

100

122

I/O DEVICE(S)
116

I/O REGISTER(S)
118

120

SOUTHBRIDGE
112

114

NORTHBRIDGE
110

MAIN MEMORY
108

CPU
102

CPU SOFTWARE
106

CACHE(S)
104

CPU SOFTWARE 106

CONFIGURATION MODULE 106a

COMMAND SUBMISSION MODULE 106b

HEAD REGISTER READ MODULE 106c

CQ ENTRY READ MODULE 106d

900

902 RECEIVE, BY A CONTROLLER AND FROM A PROCESSOR, A COMMAND VIA AN INPUT/OUTPUT (I/O) BUS

904 EXECUTE, BY THE CONTROLLER, THE COMMAND

906 UPDATE, BY THE CONTROLLER, A HARDWARE REGISTER TO INDICATE THAT THE COMMAND HAS BEEN EXECUTED

908 WRITE, BY THE CONTROLLER, CONTENTS OF THE HARDWARE REGISTER TO A SPECIFIED ADDRESS IN A MEMORY OF THE PROCESSOR

INPUT/OUTPUT (I/O) REGISTER REFLECTED IN CPU MEMORY

CROSS-REFERENCE TO RELATED APPLICATIONS

This application is a continuation claiming priority to and the benefit of U.S. application Ser. No. 17/039,125, filed on Sep. 30, 2020, and titled "INPUT/OUTPUT (I/O) REGISTER REFLECTED IN CPU MEMORY," the content of which is herein incorporated in its entirety for all purposes.

BACKGROUND

Certain computer systems include a central processing unit (CPU) and main memory on a Northbridge and input/output (I/O) devices on a Southbridge. The CPU generally communicates with an I/O device on the Southbridge over an I/O bus. The CPU can access hardware registers in the I/O device using a memory mapped interface. However, in certain cases, reading an I/O register over the I/O bus can cause additional latency for the CPU and impact the system performance.

BRIEF DESCRIPTION OF THE DRAWINGS

Various embodiments in accordance with the present disclosure will be described with reference to the drawings, in which.

DETAILED DESCRIPTION

Figure 1:
FIG. 1 illustrates a computer system that can be used to describe certain embodiments of the disclosed technologies.

Certain computer systems may include a CPU and main memory on a Northbridge, and various input/output (I/O) devices on a Southbridge. The Northbridge may be connected to the Southbridge via an internal bus or a standard bus. The I/O devices may include peripheral component interconnect (PCI) devices, universal serial bus (USB) devices, flash memory, hard discs, audio devices, solid state drives, disc drives, etc. In certain examples, the I/O devices may include network controllers, accelerator engines, crypto-engines, I/O adapters, among others. The I/O devices may be coupled to the Southbridge via an I/O bus which can be based on any appropriate bus protocol, e.g., PCI, integrated drive electronics (IDE), universal serial bus (USB), etc. In certain examples, an I/O device may include a network interface to communicate with a remote device on the network. The CPU may execute software (e.g., a device driver) to interact with the I/O device to execute certain commands. For example, a command may include performing a direct memory access (DMA) or an ultra DMA (UDMA) operation to transfer the data between the CPU memory and the I/O device. In other examples, the command may include writing or reading data to/from a remote device on the network.

In certain systems, the CPU software may send a command to the I/O device via the I/O bus. The I/O device may execute the command. Once the command has been executed, the I/O device may update a hardware register to indicate that the command has been executed. The CPU software may poll on the hardware register or get an interrupt to determine that the command has been executed. Generally, there is a relatively long latency to access the hardware register via the Northbridge and the Southbridge. For example, in most implementations, the I/O bus is shared for accesses to different I/O devices or I/O registers, and therefore the hardware register can only be accessed by the CPU software once all the pending I/O requests have been processed. Furthermore, the CPU software may have to decode the address of the hardware register on the I/O bus, which can cause additional delay and impact the system performance.

Certain embodiments can provide systems and methods to reduce the latency in reading the hardware register by reflecting contents of the hardware register in a specified location in a CPU memory. The I/O device may update the hardware register after executing the command. The I/O device can write contents of the hardware register into the specified location in the CPU memory. The CPU software can read the specified location in the CPU memory to determine whether the command has been executed instead of polling the hardware register. The CPU memory may include a main memory coupled to the CPU (e.g., a dynamic random access memory (DRAM)), or a cache memory. As an example, the latency to read the hardware register off of the I/O bus can be around 100 ns to 200 ns. The CPU software can read the hardware register from the cache memory (upon a cache hit) with a latency of around 4 ns, or from the main memory (upon a cache miss) with a latency of about 40 ns. Reducing the latency by accessing the main memory or the cache memory can allow the CPU to perform a higher number of I/O transactions in the same amount of time, thus improving the system performance.

In certain embodiments, CPU software can create a submission queue (SQ) and a completion queue (CQ) for communication with the I/O device. The SQ and the CQ can be circular buffers on the same ring, and may be memory mapped in an address space of the CPU. Each SQ entry can be a command comprising a command identifier (ID) and a command opcode. For each entry in the SQ, there may be a corresponding entry in the CQ. The CPU software can submit the commands in the SQ for execution by the I/O device hardware. The I/O device hardware can execute the commands based on the command opcode and post the completion status of the commands in the CQ.

The CPU software can submit one or more commands in the SQ and update an SQ tail index in an SQ tail doorbell register to indicate to the I/O device that one or more commands are pending in the SQ for execution. The I/O device can execute the one or more commands by reading the appropriate SQ entries. After the one or more commands have completed execution, the I/O device can submit corresponding one or more entries in the CQ. Each CQ entry can include information associated with the respective SQ entry and a completion status of the command. The I/O device may update a CQ head index in a CQ head register after submitting the one or more CQ entries. The updated CQ head index may be used by the CPU software to determine the commands that have been executed by the I/O device.

Generally, the CPU software may poll the CQ head register to determine if the one or more commands have been executed. However, this may introduce additional latency since the CQ head register is accessible via the I/O bus. Certain embodiments can considerably reduce this latency by reflecting or copying the contents of the CQ head register to a specified location in the main memory, which can provide a much faster access to the CPU software. In certain instances, the CPU software may attempt to read the contents of the CQ head register from a CPU cache before reading the main memory. In case of a cache miss, the CPU software can access the main memory, which may still provide lower latency as compared to reading the CQ head register off of the I/O bus. In case of a cache hit, the latency may be negligible and the CPU performance may improve significantly.

In most implementations, the main memory and/or the cache memory may be accessible using a fixed number of bytes, such as 32 bytes, 64 bytes or another suitable size based upon the system implementation (e.g., host processor data bus width). For case of explanation, the fixed number of bytes may be referred to as a data chunk. In certain embodiments, additional data unrelated to the command can be piggybacked with the contents of the CQ head register as part of the data chunk to be written in to the specified memory location to utilize the memory space efficiently. The piggyback data may include general information, error information, values of internal counters, updates, or any other information that may be useful to the CPU software.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates a computer system 100 that can be used to describe certain embodiments of the disclosed technologies.

The computer system 100 may include a CPU 102, main memory 108, and one or more I/O devices 116. The CPU 102 may communicate with the main memory 108 and any other high speed devices (not shown) via a Northbridge 110. The CPU 102 may also communicate with lower speed peripheral devices via a Southbridge 112. The Northbridge 110 may connect with the Southbridge 112 via a bus 114. The bus 114 may be an internal bus, a proprietary bus, or a suitable peripheral bus. Some non-liming examples of the bus 114 may include a PCIe bus, Advanced Microcontroller Bus Architecture (AMBA) bus, AMBA High-performance Bus (AHB), or Advanced extensible Interface (AXI). In various implementations, different components of the computer system 100 may be on the same die. In one example, the CPU 102 and an I/O device 116 may be part of a same system-on-chip (SoC). In another example, the CPU 102 and the I/O device 116 may be on different dies and the bus 114 may include a PCI based bus. For example, the CPU 102 can be any general purpose CPU, and the I/O device 116 can be implemented as an SoC. In some implementations, some or all of the functionalities of the Northbridge 110 and/or the Southbridge 112 can be integrated as part of the CPU 102 and/or the I/O device 116.

The CPU 102 may include one or more caches 104. The CPU 102 may execute CPU software 106 to communicate with the I/O device 116. In certain examples, the CPU software 106 may include a device driver for the I/O device 116. The CPU 102 may also include other components which are not shown here for the case of illustration. The main memory 108 may include dynamic random access memory (DRAM), synchronous DRAM (SDRAM), double data rate SDRAM (DDR SDRAM), static random access memory (SRAM), among others.

The Southbridge 112 may be coupled to the I/O devices 116 via one or more I/O buses 120. The I/O devices 116 may include PCI devices, USB devices, storage devices, BIOS flash, audio devices, and any other suitable device based on the system implementation. In certain examples, the I/O device 116 may include a controller coupled to a peripheral device or a network. For example, the I/O device 116 may include a network controller configured to communicate with a network via an interface 122 based on a network protocol such as the Ethernet, WiFi, etc. In other examples, the I/O device 116 may include an accelerator engine, a crypto-engine, or a direct memory access (DMA) engine.

The I/O device 116 may include one or more hardware I/O registers 118. The I/O register(s) 118 may be memory mapped in an address space of the CPU 102, and can be accessed by the CPU 102 via an I/O bus 120. For example, the CPU software 106 executing on the CPU 102 may be able to write or read the I/O register(s) 118. In certain examples, the CPU software 106 may have to access the I/O register 118 for executing a command, e.g., a DMA transfer. There may be a long latency to access the I/O register 118 via the Southbridge 112 and the I/O bus 120. For example, in most implementations, the I/O bus 120 is shared for accesses to different I/O devices 116, and therefore the I/O register 118 can only be accessed by the CPU software 106 once all the pending I/O requests have been processed. Additionally, an address for the command on the I/O bus 120 may have to be decoded to identify a specific I/O register in the I/O device 116. This can impact the CPU 102 performance since the number of commands that can be managed by the CPU 102 in a certain amount of time may be limited due to the long latency involved for each command.

Certain embodiments can provide systems and methods to lower the latency in accessing the I/O register 118 by reflecting contents of the I/O register 118 to a specified location or address in the main memory 108. This can allow the CPU software 106 to read the contents of the I/O register 118 from the main memory 108 or the cache 104 instead of going across the Southbridge 112 and the I/O bus 120. Having the lower latency to access the I/O registers 118 can allow the CPU 102 to manage more commands in a certain amount of time, thus improving the performance.

Figure 2:
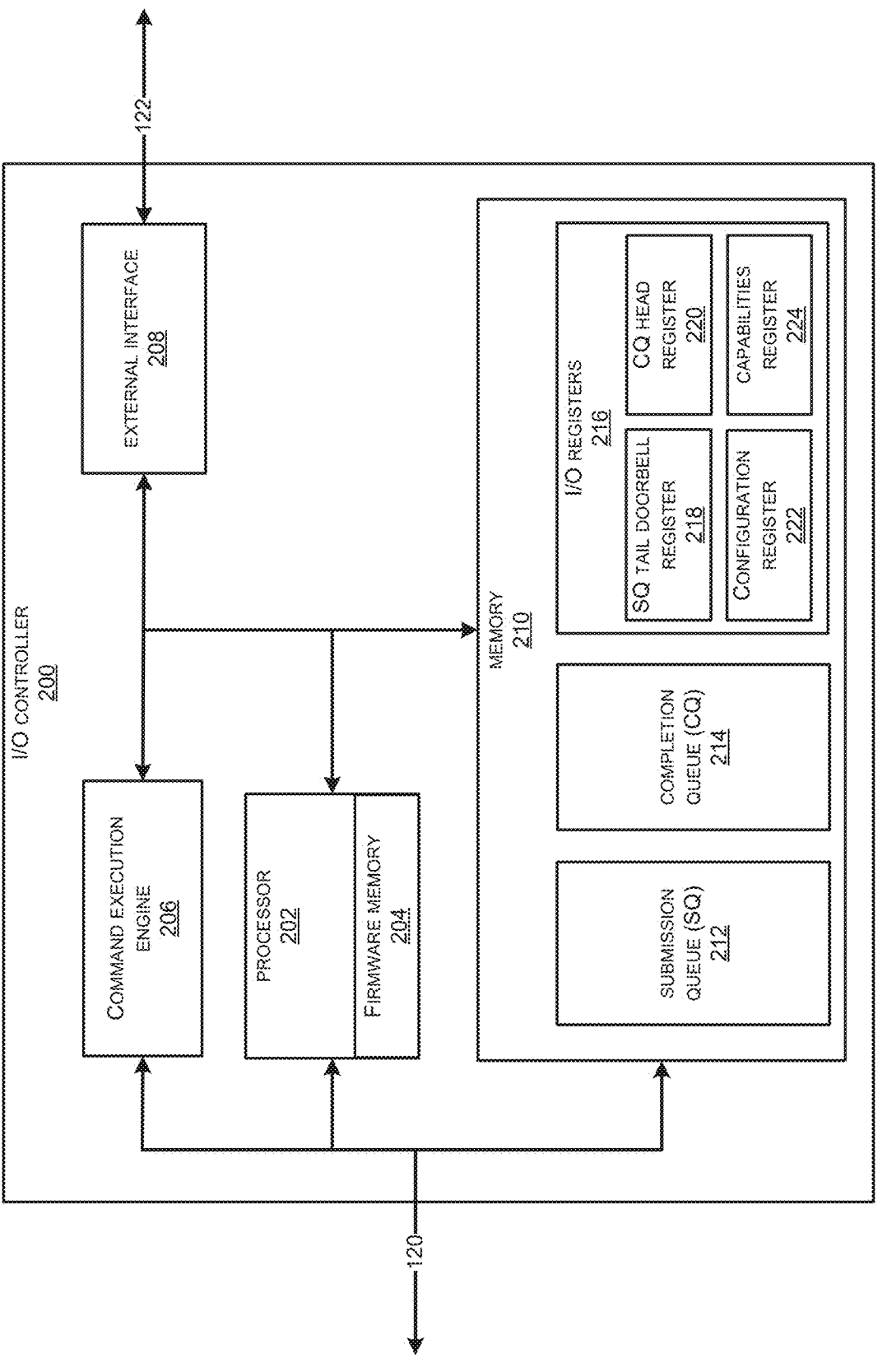
FIG. 2 illustrates a high level block diagram for an I/O controller that can be used to implement certain embodiments.

FIG. 2 illustrates a high level block diagram for an I/O controller 200 that can be used to implement certain embodiments.

The I/O controller 200 can be one of the I/O devices 116 as described in FIG. 1. The I/O controller 200 may include a processor 202 coupled to a memory 210, a command execution engine 206, and an external interface 208. The processor 202, memory 210, and the command execution engine 206 may be accessible to the CPU 102 via the I/O bus 120. The processor 202 may be configured to execute compiled code stored in a firmware memory 204. For example, the firmware memory 204 may include a flash memory, ROM, EEPROM, or another non-volatile memory. The memory 210 may include a submission queue (SQ) 212, a completion queue (CQ) 214, and I/O registers 216. The I/O registers 216 may include the I/O registers 118 of FIG. 1.

In certain embodiments, the I/O controller 200 can be a network controller and the external interface 208 may include a network interface. For example, the external interface 208 may include a media access control (MAC) module, a physical Ethernet port, and other components or functionality to enable communication with a remote device on a network via the interface 122. The network may be based on a protocol such as the Internet Protocol (IP), Ethernet, Wi-Fi, Transmission Control Protocol (TCP), User Datagram Protocol (UDP), Asynchronous Transfer Mode (ATM), token ring, frame relay, Point-to-Point Protocol (PPP), Fiber Distributed Data Interface (FDDI), among other network protocols. The I/O controller 200 may communicate with one or more remote devices for storage, data processing, analysis, archiving, web services, etc.

In other embodiments, the I/O controller 200 may include an accelerator engine, a crypto-engine, or a storage device controller, and may be configured to communicate with a network, an audio device, a storage device, or another I/O device using the external interface 208. The external interface 208 may be based on any suitable protocol to support the I/O device including USB, serial ATA, parallel ATA, PCI, SPI, or a network protocol.

The memory 210 can be implemented using an SRAM, a DRAM or another suitable volatile memory. The I/O registers 216 may include an SQ tail doorbell register 218, a CQ head register 220, a configuration register 222, and a capabilities register 224. The SQ 212, CQ 214, SQ tail doorbell register 218, CQ head register 220, configuration register 222 and the capabilities register 224 may be memory mapped in the address space of the CPU 102. For example, the CPU software 106 executing on the CPU 102 can write or read the SQ 212, CQ 214, SQ tail doorbell register 218, CQ head register 220, configuration register 222 and the capabilities register 224 over the I/O bus 120. Note that the SQ 212, CQ 214, or the I/O registers 216 can be implemented using different memory types, or located in different components of the I/O controller 200 without deviating from the scope of the disclosure.

The SQ 212 and the CQ 214 can be circular buffers of fixed size in a same ring. The SQ 212 may be used by the CPU software 106 to submit one or more commands for execution by the I/O controller 200. The SQ tail doorbell register 218 may include an SQ tail index which may point to a next available entry in the SQ 212 for submitting a new command. The I/O controller 200 may execute the one or more commands submitted in the SQ 212 and submit corresponding entries in the CQ 214 with the completion status of each command. After submitting the one or more CQ entries, the I/O controller 200 may update a CQ head index in the CQ head register 220. In certain implementations, the I/O controller 200 may update the CQ head register 220 after a configurable number of commands have been executed. In certain implementations, the I/O controller 200 may update the CQ head register 220 based upon expiration of a timer or an internal counter reaching a threshold value. For example, a timer or a counter can be used to time bound execution period of one or more commands which may not complete within a certain time period due to an error or missing data. The corresponding CQ entries may include appropriate completion status of each command. The updated CQ head index may point to an index in the ring which can be used by the CPU software 106 to determine how many commands have been executed by the I/O controller 200.

The configuration register 222 may store a specific memory address which can be used by the I/O controller to write to the main memory 108 with updates of the CQ head register 220 for one or more commands and any additional data unrelated to the command. The configuration register 222 may also be programmed with a number of commands that have to be executed by the I/O controller 200 before updating the CQ head register 220. The configuration register 222 may also be programmed with a threshold value or a timer value which has to be met before updating the CQ head register 220. The configuration register 222 can be set up by the CPU software 106. The capabilities register 224 may include capabilities supported by the I/O controller 200 which can be read by the CPU software 106 to create and set up the SQ 212 and the CQ 214. For example, the CPU software 106 can determine the size (e.g., number of entries, size of each entry) of the SQ 212 and the CQ 214 based on the capabilities supported by the I/O controller 200. In certain embodiments, a pair of the SQ 212 and the CQ 214 can be created for each processor core of the CPU 102 based on the system configuration. Operations of the SQ 212 and the CQ 214 are explained with reference to FIG. 3.

The command execution engine 206 may include hardware and software components to execute the commands submitted by the CPU software 106 in the SQ 212. Execution of a command may indicate that the command has been processed by the I/O controller 200 irrespective of whether the execution of the command was successful, unsuccessful or incomplete. In certain embodiments, the command execution engine 206 may include functionality of a DMA controller or an ultra DMA (UDMA) controller which can be used to transfer data between two memory locations or devices with minimum CPU overhead. For example, a DMA operation may be performed to store packets from a network location to the main memory 108, or to transfer data from the main memory 108 to a storage device (hard disc). In certain embodiments, the CPU software 106 may submit a command in the SQ 212 to execute the DMA operation. The command execution engine 206 may execute the command by performing the DMA operation. In certain implementations, the command execution engine 206 may include a control unit, register files, an arbiter, or any other suitable components to implement the DMA or UDMA controller functionality. Note that the command execution engine 206 can include components or functionality to support different commands in addition or in place of a DMA command without deviating from the scope of the disclosure.

Figure 3:
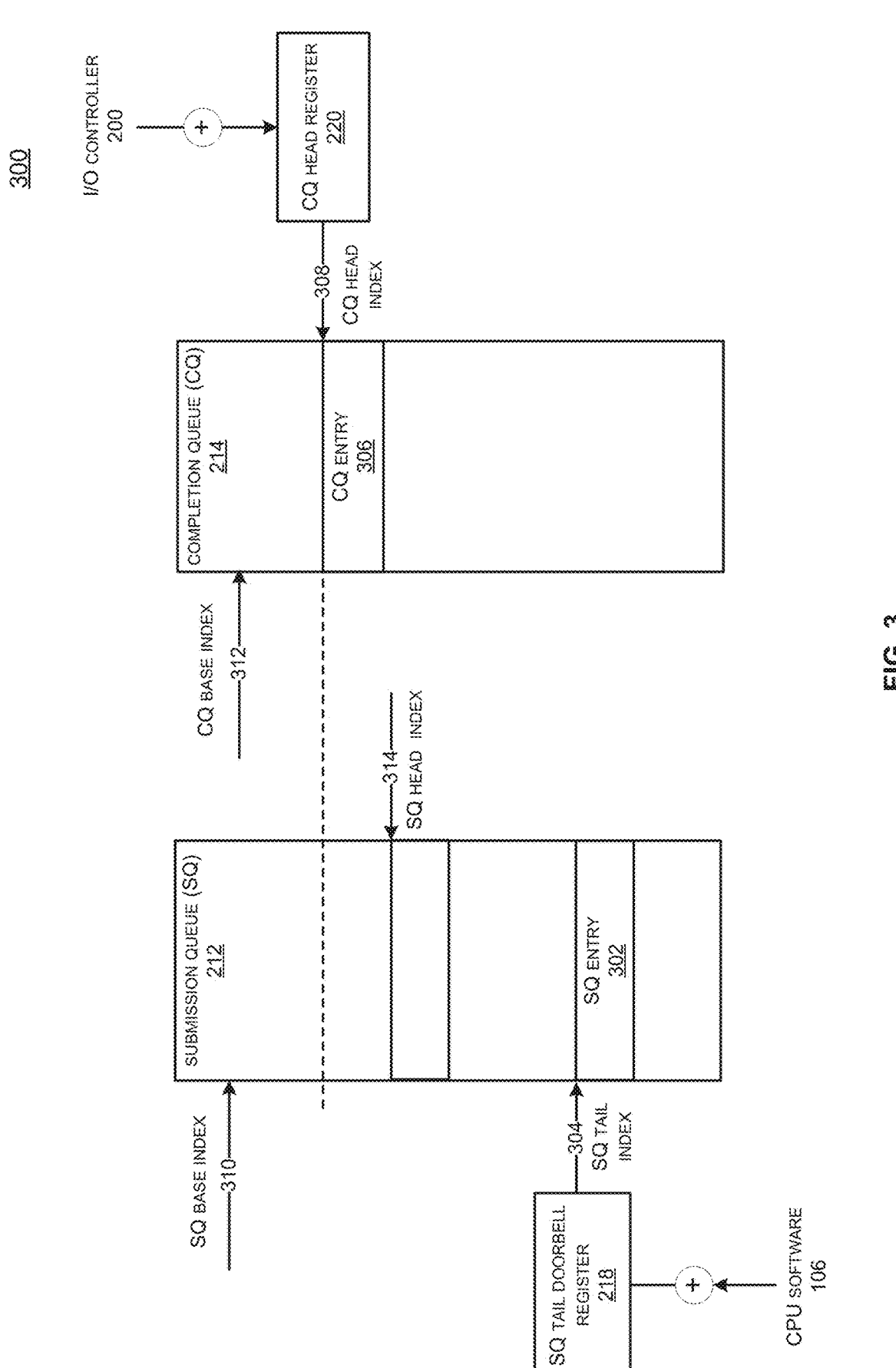
FIG. 3 illustrates operations of a submission queue (SQ) and a completion queue (CQ) according to certain embodiments.

FIG. 3 illustrates operations 300 of the SQ 212 and the CQ 214 according to certain embodiments. The SQ 212 and the CQ 214 may be memory mapped in the address space of the CPU 102. Each entry in the CQ 214 may correspond to a respective entry in the SQ 212. An SQ base index 310 may point to a base address for the SQ 212, and a CQ base index 312 may point to a base address for the CQ 214. Each entry in the SQ 212 may be at a respective offset from the memory mapped address of the SQ base index 310. Similarly, each entry in the CQ 214 may be at a respective offset from the memory mapped address of the CQ base index 312.

An SQ tail index 304 may point to a next available SQ entry 302 in the SQ 212. The CPU software 106 may identify the next available entry using the SQ tail index 304 and submit a new command in the next available entry. After submitting the new command, the CPU software 106 may write to the SQ tail doorbell register 218 with an updated value of the SQ tail index 304. Writing to the SQ tail doorbell register 218 may indicate to the I/O controller 200 that one or more new commands are in the SQ 212 for execution. The updated value of the SQ tail index 304 can be used to determine the number of commands submitted to the SQ 212 based on the previous value of the SQ tail index 304. For example, upon submitting one command in the SQ 212, the CPU software 106 may increment the SQ tail index 304 by one in the SQ tail doorbell register 218, which will point to the next available entry. If the SQ tail index 304 reaches the last entry of the SQ 212, the SQ tail index 304 may roll over to the first entry in the SQ 212. In certain embodiments, the SQ tail doorbell register 218 may be a write only register for the CPU software 106, and a read only register for the I/O controller 200. An SQ head index 314 can be updated by the I/O controller 200 after fetching one or more commands from the SQ 212 for processing. For example, the I/O controller 200 may retrieve the next entry in the SQ 212 as pointed by the SQ head index 314, and then increment the SQ head index 314. The SQ head index 314 can roll back to zero when the incremented value of the SQ head index 314 exceeds the size of the SQ 212.

The CQ head register 220 may include a CQ head index 308 of the CQ 214. The CQ head index 308 may point to a next available CQ entry 306 in the CQ 214. After executing one or more commands submitted in the SQ 212 or upon expiration of a timer, the I/O controller 200 may submit one or more corresponding entries in the CQ 214 using the current value of the CQ head index 308, and write an updated value of the CQ head index 308 in the CQ head register 220. The CQ head index 308 may indicate the CQ entries in the ring that have been processed by the I/O controller 200. In certain embodiments, every time the CQ head index 308 is updated in the CQ head register 220, contents of the CQ head register 220 can be copied to a specified location in the main memory 108. In order to determine whether a command has been executed, the CPU software 106 can read contents of the CQ head register 220 from that specified location in the main memory 108 or the cache 104 (e.g., by polling or by interrupt) instead of reading the CQ head register 220 on the I/O bus 120, which can significantly reduce the latency. Once the CPU software 106 determines that the command has been executed, the CPU software 106 can read the CQ entry for that command to determine whether the command was successfully completed. The SQ and CQ entries are further explained with reference to FIG. 4.

Figure 4:
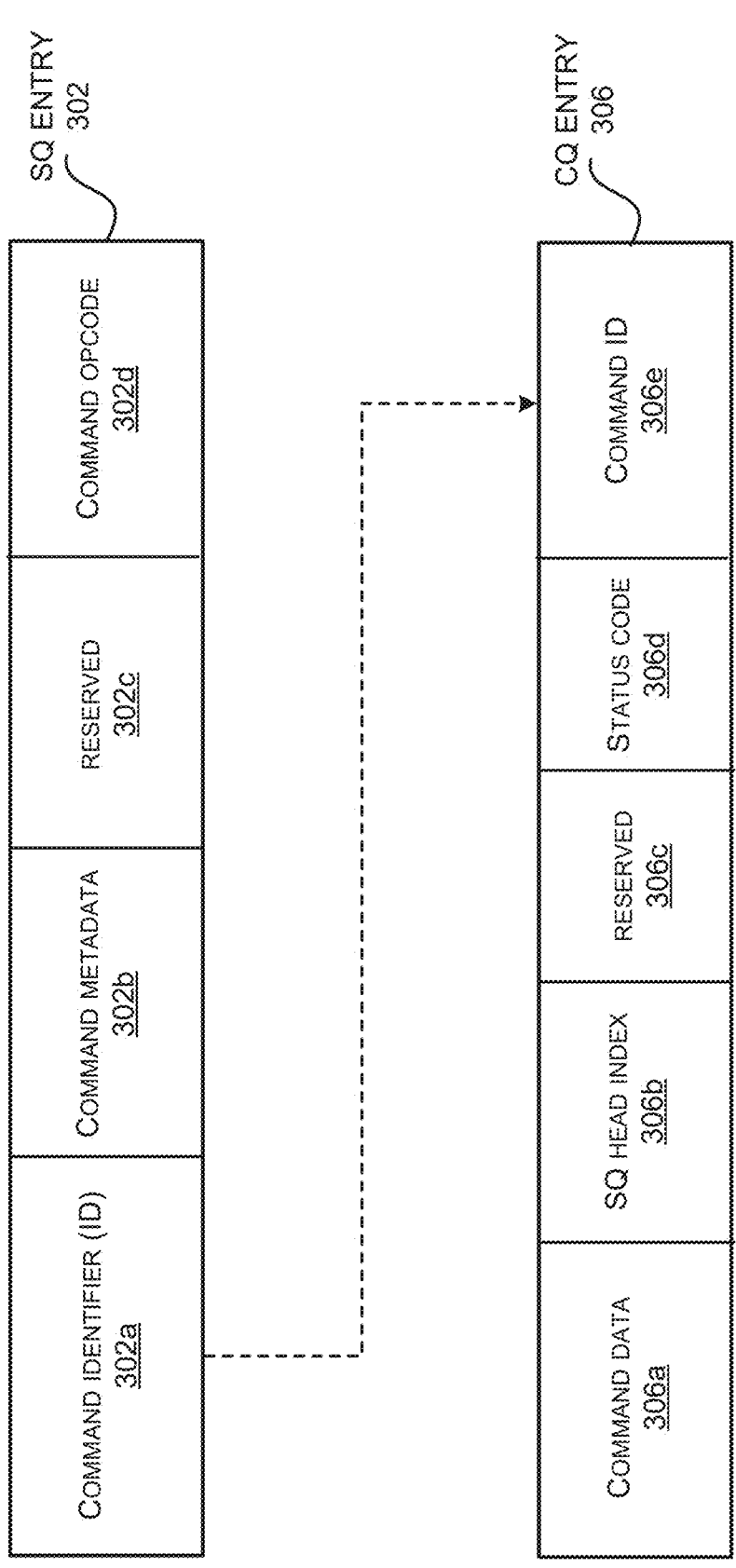
FIG. 4 illustrates example fields of an SQ entry and a CQ entry that can be used to describe certain embodiments.

FIG. 4 illustrates example fields of the SQ entry 302 and the CQ entry 306 that can be implemented in certain embodiments. Each entry in the SQ 212 can be similar to the SQ entry 302, and each entry in the CQ 214 can be similar to the CQ entry 306.

The SQ entry 302 may include a command identifier (ID) 302a, command metadata 302b, a reserved field 302c, and a command opcode 302d. The command ID 302a may include a unique ID, which can be used to identify a command. The command metadata 302b may include memory addresses, a descriptor, an address to pointers, or other suitable metadata associated with the command. The command opcode 302d may include an opcode for the command to be executed. As an example, the command opcode 302d may specify a DMA operation and the command metadata 302b may include a descriptor or a pointer to the descriptor for the DMA operation. The descriptor may include one or more of source address, destination address, number of data elements to be transferred, size of each data element, transfer type, etc.

The CQ entry 306 may include command data 306a, an SQ head index 306b, a reserved field 306c, a status code 306d, and a command ID 306e. The command data 306a may include data specific to the command, for example, signature to validate data for a crypto engine, signature of a network packet, metadata associated with the command, among others. The SQ head index 306b may indicate a current value of the SQ head index 314 of the SQ 212, which can be used to indicate to the CPU software 106 the number of SQ entries that have been consumed and may be re-used for submitting new commands. In certain embodiments, the reserved field 306c may include an SQ identifier if there are more than one SQs managed by the CPU 102. The status code 306d may indicate status for the command that is being completed. For example, the status code 306d may include command status (e.g., successful completion, fatal error, non-fatal error, invalid command opcode, invalid command parameters, command specific status, vendor specific status, among others). The command specific status may include command specific errors for a given command opcode. The command ID 306e may indicate the identifier of the command that is being completed. This ID may be assigned by the CPU software 106 when the command is submitted in the SQ 212 and may be same as the command ID 302a of the corresponding SQ entry.

Figure 5:
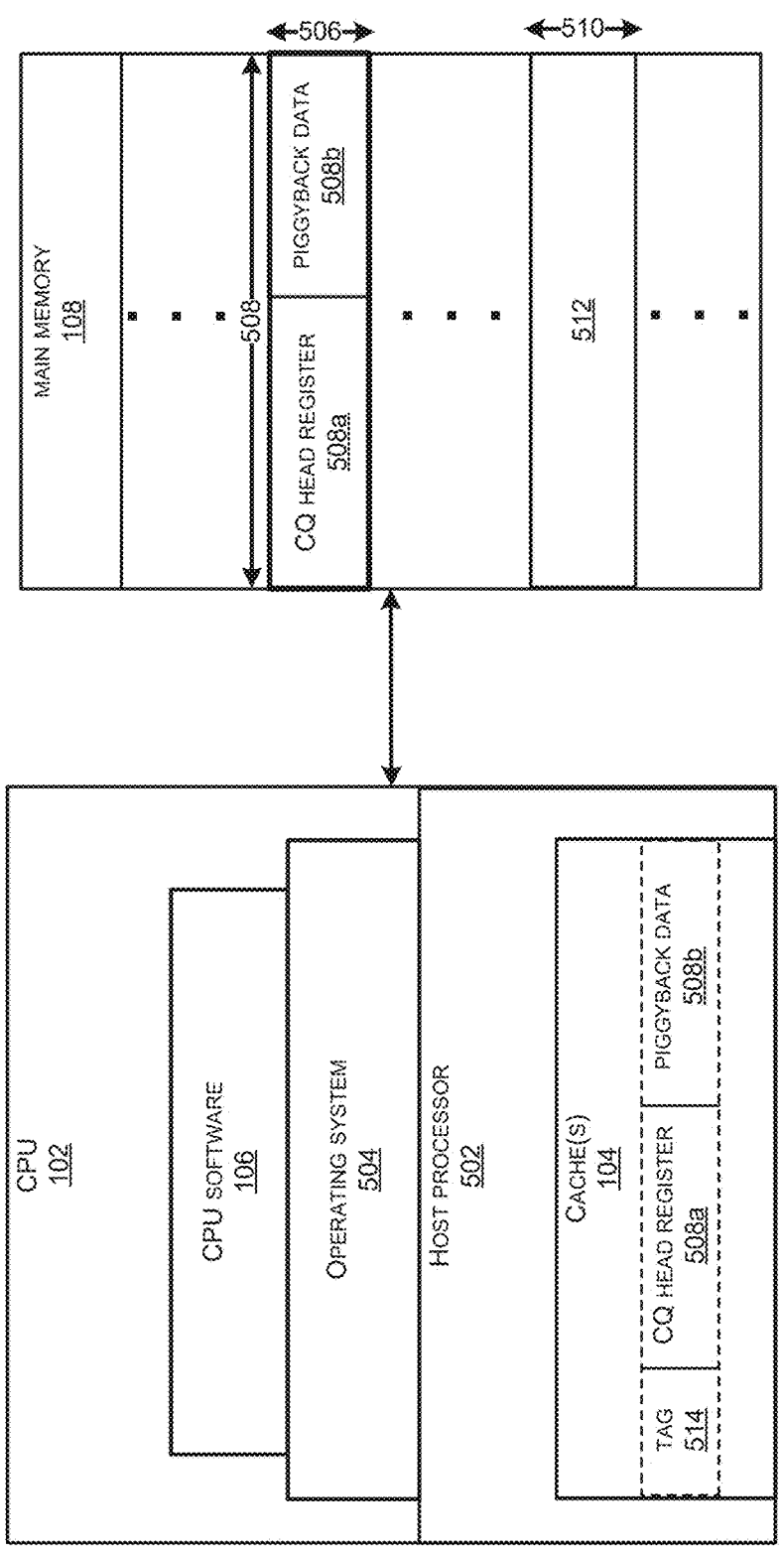
FIG. 5 illustrates a high level diagram of a CPU coupled with a main memory in accordance with certain embodiments.

FIG. 5 illustrates a high level diagram of the CPU 102 coupled with the main memory 108 in accordance with certain embodiments.

The CPU 102 may include a host processor 502 and one or more caches 104. The CPU 102 may be configured to execute instructions stored in a computer-readable storage medium (not shown). The computer-readable storage medium may be non-transitory. The computer-readable-medium may include a ROM, EEPROM, flash, or another suitable memory. The instructions may enable the CPU 102 to perform intended functionality based on the features supported by the CPU 102.

The host processor 502 may include one or more processor cores. The caches 104 may include multi-level caches, e.g., L1 cache, L2 cache, L3 cache. In certain embodiments, the L1 cache may be integrated with the host processor 502, and the L2 and L3 caches may be external to the host processor 502. For multi-core processors, each processor core may have a dedicated L1 cache. Note that different implementations of the cache hierarchy are possible without deviating from the scope of the disclosure. The caches 104 may be used to store copies of frequently used memory locations of the main memory 108. Each cache entry in the cache 104 may correspond to a cache line storing a copy of a data chunk from the main memory 108, and a tag 514 indicating the memory location of that data chunk in the main memory 108. Note that any suitable cache protocol (e.g., write-through, write-back, snooping, etc.) can be used to manage cache coherence for the caches 104.

An operating system 504 may configure and manage the hardware and software components of the CPU 102. The operating system 504 may enable access to hardware devices coupled to the CPU 102 via the I/O bus 120 using one or more applications. In certain examples, the operating system 504 may install and execute the CPU software 106 to enable the operating system 504 and the applications to use the I/O controller 200. As an example, the CPU software 106 may include a device driver for the I/O controller 200. The CPU software 106 may create and configure the SQ 212, CQ 214, SQ tail doorbell register 218, CQ head register 220, and the configuration register 222 in the address space of the host processor 502. The CPU software 106 may assign or specify an address 506 in the main memory 108, and program the configuration register 222 with the memory address 506 to be used by the I/O controller 200 for writing any updates. In various embodiments, the host processor 502 may include multiple processor cores and the CPU software 106 may assign a combination of SQs and CQs for each processor core. However, for the purposes of this disclosure, one pair of SQ and CQ will be described for the host processor 502. Functional components of the CPU software 106 are further described with reference to FIG. 6.

The main memory 108 may be used by the I/O controller 200 to store a data chunk 508 at the specified address 506 assigned by the CPU software 106. A first portion 508a of the data chunk 508 may include contents of the CQ head register 220. Depending on the size of the data chunk 508 and the CQ head register 220, other data unrelated to the command can be piggybacked into a second portion 508b of the same data chunk 508 by the I/O controller 200. For example, in some implementations, the data chunk 508 can be 64 bytes but the CQ head register 220 may only use 8 bytes. Therefore, most of the data chunk 508 may remain unused. In certain embodiments, the second portion 508b may be used to store additional data (for example, piggyback data) unrelated to the first portion 508a to utilize the unused data chunk 508. The piggyback data may include completion status of commands executed by other processor cores, errors encountered during command execution, network link status, internal counters, or any other data which can be useful to the CPU software 106. For example, the completion status of commands may include contents of head registers associated with other CQs, completion status of different DMA operations or other commands submitted by different processor cores. An example error may include information associated with a network link, e.g., when the Ethernet link is down or otherwise unavailable. The network link status may be provided by the MAC module in the network controller. The data chunk 508 may be updated in the main memory 108 whenever there is a change in the CQ head register 220 or in the piggybacked data.

The main memory 108 may also be used to store data related to other functions performed by the CPU 102. For example, the CPU software 106 may submit a command in the SQ 212 for the I/O controller 200 to perform a DMA operation to transfer a block of data 512 from a memory address 510 to a storage device coupled to the I/O controller 200. In another example, the DMA operation may be used to transfer data from a remote device on the network to the memory address 510.

Figure 6:
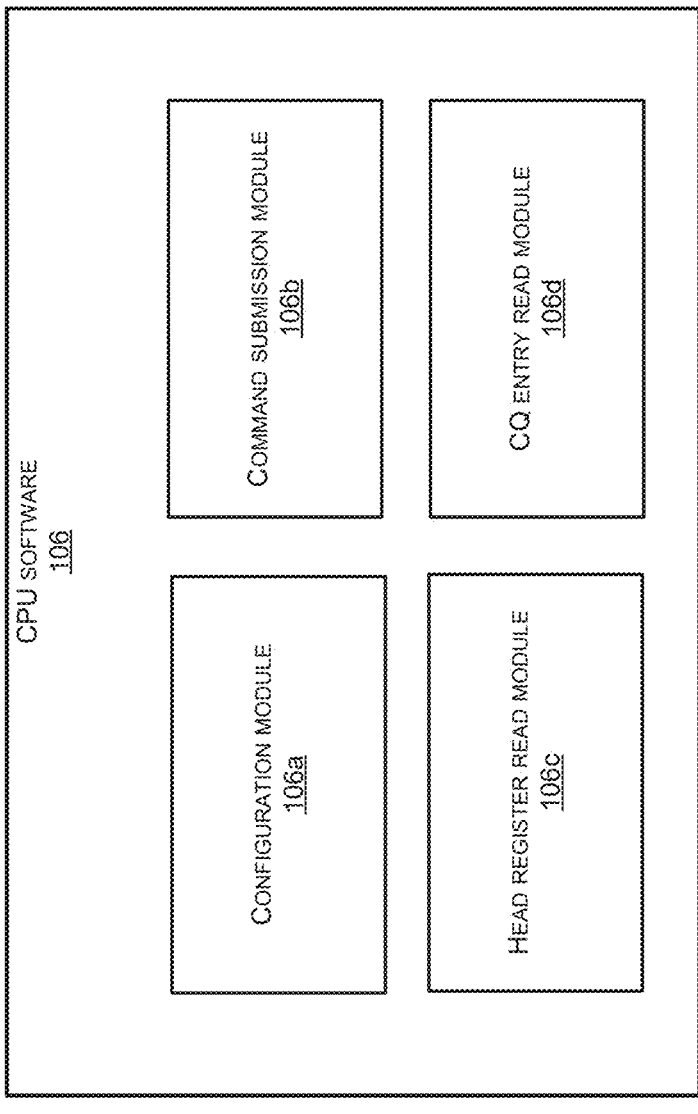
FIG. 6 shows example components of the CPU software in certain embodiments.

FIG. 6 shows example components of the CPU software 106 in certain embodiments. The CPU software 106 may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The CPU software 106 may include a configuration module 106a, a command submission module 106b, a head register read module 106c, and a CQ entry read module 106d. Note that the CPU software 106 may include different or additional components than those described with reference to FIG. 6 without deviating from the scope of the disclosure.

The configuration module 106a may be used to create one or more SQs and one or more CQs based on the features supported by the I/O controller 200 or the CPU 102. For example, based on the system configuration or the workload, size of the SQs, CQs, the SQ entry, or the CQ entry can be determined. In certain embodiments, the configuration module 106a may access the capabilities register 224 in the I/O controller 200 to determine the capabilities supported by the I/O controller 200 including the set of supported commands, maximum queue size supported for both the SQ and the CQ, among others. The configuration module 106a may also be used to assign or specify a memory address (e.g., the memory address 506) for the I/O controller 200 to write the updated value of the CQ head register 220 for one or more commands in the first portion 508a, or any other unrelated data in the second portion 508b of the data chunk 508. In certain embodiments, the configuration module 106a may write to the configuration register 222 in the I/O controller 200 with the specified memory address 506 to be used for updates, and a threshold value or a timer value.

The command submission module 106b may be used to submit one or more commands in the SQ 212. As discussed previously with reference to FIGS. 2-4, the command submission module 106b may write one or more commands in the SQ 212 based on the current value of the SQ tail index 304. Each entry in the SQ 212 may store one command and can be similar to the SQ entry 302 as shown in FIG. 4. The command submission module 106b may write to the SQ tail doorbell register 218 with an updated value of the SQ tail index 304 based on the number of commands submitted in the SQ 212. The update of the SQ tail index 304 may indicate to the I/O controller 200 that new commands have been submitted in the SQ 212 for execution.

The head register read module 106c may be used to read a specified memory address in the main memory 108 to determine whether the command submitted by the command submission module 106b has been executed. As discussed with reference to FIG. 5, the head register read module 106c can read the memory address 506 to determine the commands that have been processed based on the value of the SQ tail index 304 in the CQ head register 220 reflected in the first portion 508a of the data chunk 508. The head register read module 106c may also read the memory address 506 to identify an update in the piggyback data stored in the second portion 508b of the data chunk 508. In certain implementations, the head register read module 106c can poll on the value read from the data chunk 508 to identify an update of one or more portions of the data chunk 508. The head register read module 106c may first attempt to access the cache 104 to read the data chunk based on the tag 514 associated with the memory address 506. If the cache line storing the data chunk 508 exists in the cache 104 (e.g., a cache hit), the head register read module 106c may read the cache line from the cache 104 with a negligible latency. If the data chunk 508 does not exist in the cache 104 (e.g., a cache miss), the head register read module 106c may read the data chunk 508 from the main memory 108 with a little longer latency that may still be much less than reading the CQ head register 220 on the I/O bus 120.

The CQ entry read module 106d may be used to read the CQ entries upon determining that one or more commands have been executed. Each entry read from the CQ 214 may be similar to the CQ entry 306 as shown in FIG. 4. The command ID 306e read from the CQ entry can be correlated with the command ID 302a for the submitted command. Based on the status code 306d, the CPU software 106 can determine whether the command has been successfully completed or an error was encountered during the execution of the command, and can take appropriate action. The SQ head index 306b may indicate a current value of the SQ head index 314 indicating the number of entries that have been fetched by the I/O controller 200 from the SQ 212 for execution so those entries may be available for re-use by the CPU software 106.

Figure 7:
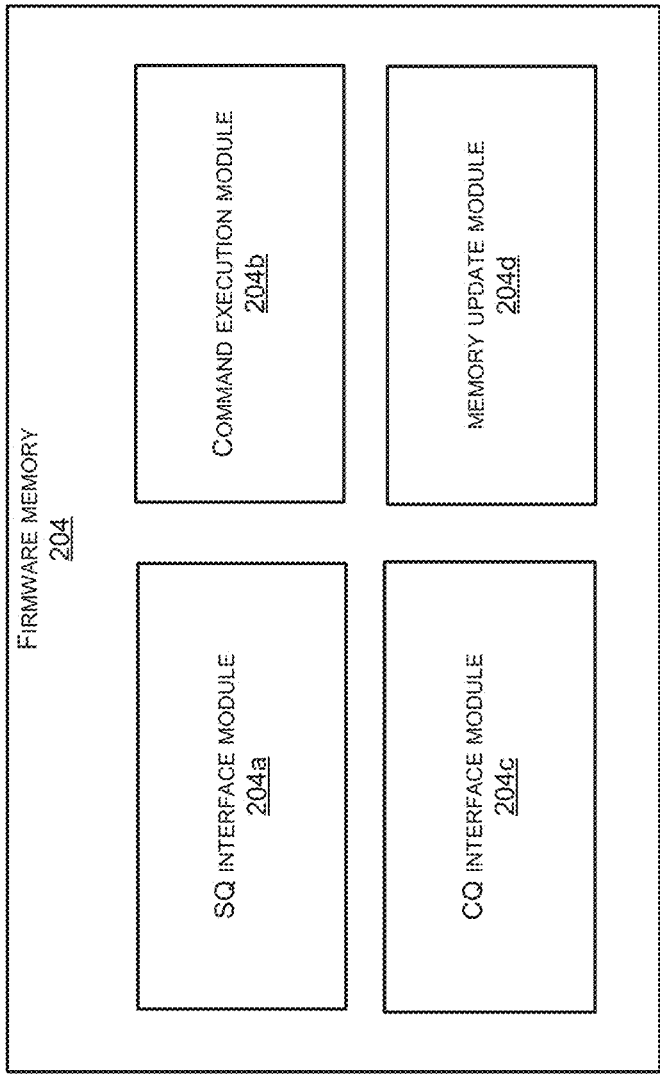
FIG. 7 shows example components of firmware memory for the I/O controller in certain embodiments.

FIG. 7 shows example components of the firmware memory 204 for the I/O controller 200 in certain embodiments. The firmware memory 204 may include an SQ interface module 204a, a command execution module 204b, a CQ interface module 204c, and a memory update module 204d.

The SQ interface module 204a may be used to interface with the SQ 212 for reading the commands submitted by the CPU software 106 for execution. For example, based on an update of the SQ tail index 304, the SQ interface module 204a may identify when there are one or more entries submitted in the SQ 212 for processing. The SQ interface module 204a may read the one or more entries newly submitted in the SQ 212, and update the SQ head index 314 accordingly to indicate that there is room to submit more entries.

The command execution module 204b may be used to execute each command for a corresponding entry submitted in the SQ 212. As discussed with reference to FIG. 4, each SQ entry may include a respective command as identified by the command ID 302a. The command execution module 204b may execute the command based on the command opcode 302d. As an example, the command opcode 302d may indicate a DMA operation and the command metadata 302b may include additional information for the DMA operation. For example, the command metadata 302b may include a source address, a destination address, a size of the data transfer, and any other relevant information. The source or the destination address may include a physical memory location in the main memory 108, a memory location associated with a peripheral or a remote device. In certain examples, the source or the destination address may include pointers to memory locations.

The CQ interface module 204c may be used to interface with the CQ 214 to submit an entry in the CQ 214 for each executed command. For example, after one or more commands have been executed by the command execution module 204b, a threshold value has been met or a timer has expired, the CQ interface module 204c may submit a corresponding entry in the CQ 214 for each newly executed command. In certain instances, a command may not finish executing within a certain time period due to an error, incomplete information, or other issues, and therefore a timer or a counter can be used to time bound the command execution period. Each submitted CQ entry may include a status code 306d indicating whether the command was completed successfully or not. The command may be identified and correlated with a submitted command using the command ID 306c. The CQ interface module 204c may also update the CQ head index 308 in the CQ head register 220 for each newly submitted entry in the CQ 214.

The memory update module 204d may be used to update the specified memory location in the main memory 108 based on a number of factors. The memory update module 204d may write the contents of the CQ head register 220 in the specified memory location every time the CQ head register 220 is updated after execution of one or more commands or upon expiration of a timer so that the CPU software 106 can read the command status 306d from the CQ 214 to take any necessary action. In certain implementations, the memory update module 204d may update the CQ head register 220 after a configurable number of commands have been executed. For example, the memory update module 204d may write to the memory address 506 with the updated contents of the CQ head register 220 in the first portion 508a and the piggyback data in the second portion 508b of the data chunk 508. The piggyback data may include data unrelated to the command associated with the update of the CQ head register 220, and may be provided by different components of the I/O controller 200 based on the functionality supported by the I/O controller 200.

Figure 8:
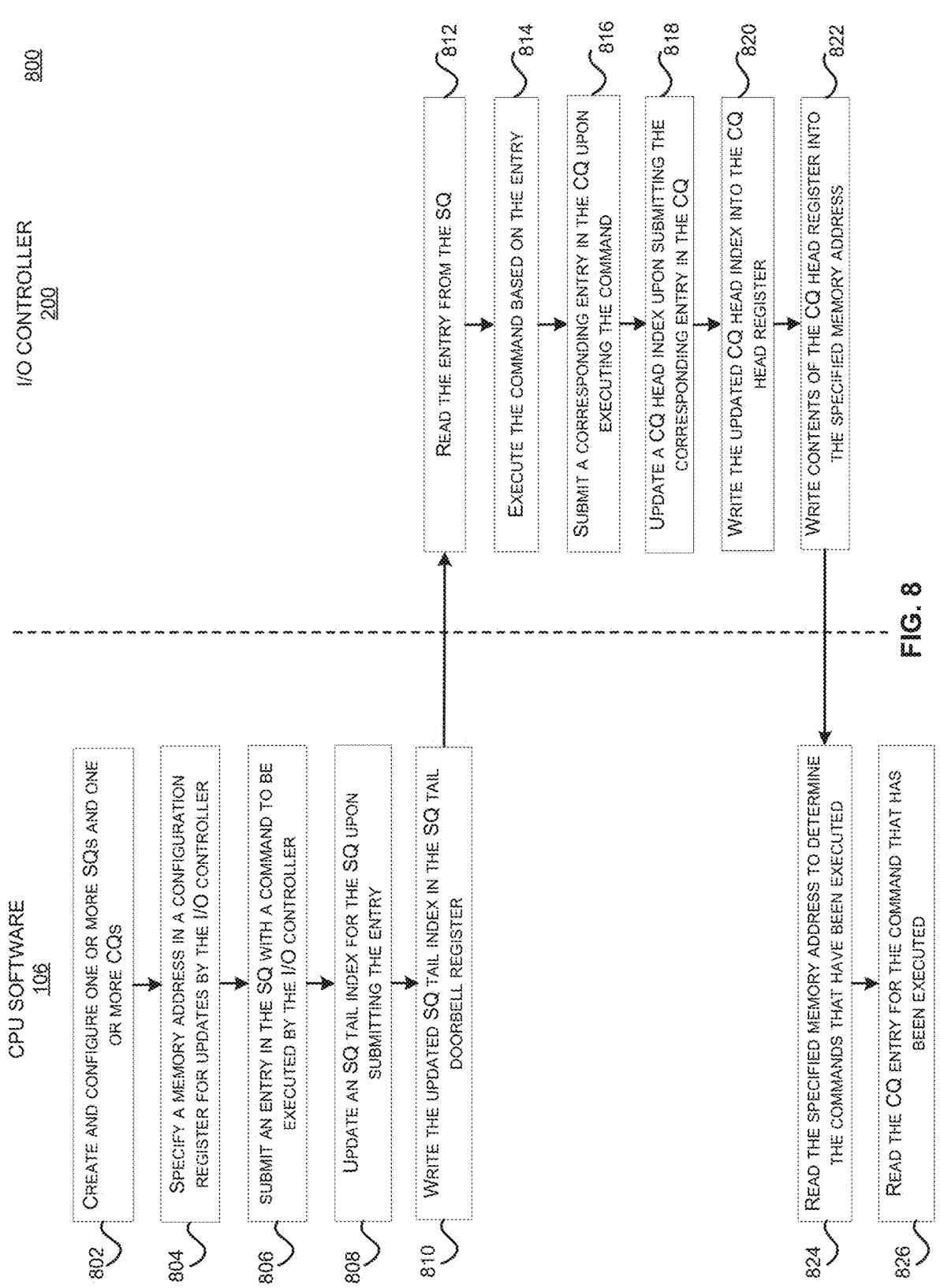
FIG. 8 illustrates communication between the CPU software and the I/O controller for execution of a command, in accordance with certain embodiments.

FIG. 8 illustrates communication 800 between the CPU software 106 and the I/O controller 200 for execution of a command, in accordance with certain embodiments. The CPU software 106 may be executing on a processor, e.g., the host processor 502 for the CPU 102. The CPU 102, main memory 108, and the I/O controller 200 can be part of an apparatus. For example, the I/O controller 200 can be an SoC, and the CPU 102 and the main memory 108 can be part of the SoC or can be external to the SoC.

At step 802, the CPU software 106 may create and configure one or more SQs and one or more CQs. The CPU software 106 may be executing on the host processor 502 as discussed with reference to FIG. 5. The configuration module 106a may create one or more SQs and one or more CQs based on the system configuration and the capabilities supported by the I/O controller 200. For example, the CPU software 106 may read the capabilities register 224 to determine the features or capabilities supported by the I/O controller 200 and create the SQ 212 and the CQ 214 in the memory of the I/O controller 200. The SQ 212 and the CQ 214 may be circular buffers in the same ring and can be accessed by the CPU software 106 on the I/O bus 120. The SQ base index 310 may indicate a base address for the SQ 212 and the CQ base index 312 may indicate a base address for the CQ 214.

At step 804, the CPU software 106 may specify a memory address in a configuration register for updates by the I/O controller 200. As discussed with reference to FIG. 5, the CPU software 106 may specify the memory address 506 in the configuration register 222 which can be written by the I/O controller 200 to store the data chunk 508 comprising the contents of the CQ head register 220 in the first portion 508a and the piggyback data in the second portion 508b. For example, the configuration module 106a may write the configuration register 222 with the memory address 506 to be used for writing the data chunk 508 to the main memory 108.

At step 806, the CPU software 106 may submit an entry in the SQ with a command to be executed by the I/O controller. As discussed with reference to FIG. 3, the command submission module 106b may identify the next available entry using the SQ tail index 304 and submit a new command in the next available entry. The entry may be similar to the SQ entry 302 described with reference to FIG. 4. The command may include performing a DMA or an ultra DMA operation as indicated by the command opcode 302d. The descriptor for the DMA operation may be included in the command metadata 302b. The command may include the unique command ID 302a.

At step 808, the CPU software 106 may update an SQ tail index for the SQ upon submitting the entry. The command submission module 106b may update the SQ tail index 304 upon submitting one or more entries in the SQ 212. The command submission module 106b may increment the SQ tail index 304 each time an entry is submitted in the SQ 212, or after submitting multiple entries. When the SQ tail index 304 reaches the last entry of the SQ 212, the SQ tail index 304 may roll over to the first entry in the SQ 212.

At step 810, the CPU software 106 may write the updated SQ tail index in the SQ tail doorbell register. The command submission module 106b may write the updated value of the SQ tail index 304 in the SQ tail doorbell register 218. In certain examples, the command submission module 106b may write multiple entries in the SQ 212 and write a final updated value of the SQ tail index 304 in the SQ tail doorbell register 218. Updating the SQ tail index 304 may indicate to the I/O controller 200 that there is a new entry in the SQ 212 for execution.

At step 812, the I/O controller 200 may read the entry from the SQ. The SQ interface module 204a may fetch one or more commands from the SQ 212 based on the updated value of the SQ tail index 304. The SQ interface module 204a may increment the SQ head index 314 after fetching the one or more commands to indicate to the CPU software 106 that there is room for submitting new entries.

At step 814, the I/O controller 200 may execute the command based on the entry. If more than one commands are fetched, the I/O controller 200 may execute the commands in any order. The command execution module 204b may execute each command based on the command opcode 302d and the associated command metadata 302b in the respective SQ entry. For example, the command execution module 204b may perform the DMA operation between the source address and the destination address based on the DMA descriptor in the command metadata 302b. As an example, to copy the block of data 512 from the main memory 108 to a storage device using a DMA operation, the command metadata 302b may include the memory address 510 as the source address, the destination address for the storage device, and the size of the block of data 512. In another example, instead of the source address and the destination address, the command metadata 302b may include pointers to the source and destination addresses.

At step 816, the I/O controller 200 may submit a corresponding entry in the CQ upon executing the command. For example, the CQ interface module 204c may submit a corresponding CQ entry in the CQ 214 once the command has been executed by the command execution module 204b. The submitted entry may be similar to the CQ entry 306 described with reference to FIG. 4. For example, the submitted CQ entry may include the status code 306d indicating whether the command was completed successfully or not. The command may be identified and correlated with a submitted command using the command ID 306c.

At step 818, the I/O controller 200 may update the CQ head index upon submitting the corresponding entry in the CQ. The CQ interface module 204c may update the CQ head index 308 after submitting the entry in the CQ 214. The CQ head index 308 may point to an index in the ring indicating the commands that have been processed.

At step 820, the I/O controller 200 may write the update CQ head index into the CQ head register. The CQ interface module 204c may write the updated CQ head index 308 into the CQ head register 220. In certain embodiments, the CQ interface module 204c may update the CQ head register 220 upon expiration of a timer or reaching a threshold value to time bound execution of one or more commands.

At step 822, the I/O controller 200 may write contents of the CQ head register 220 into the specified memory address. The memory update module 204d may write contents of the CQ head register 220 at the memory address 506 as the first portion 508a of the data chunk 508 and any piggyback data as the second portion 508b of the data chunk 508. The piggyback data may be unrelated to the command executed by the I/O controller 200 (e.g., data that is not involved with execution of the command), and may include any data which may be relevant to the CPU software 106 for other tasks. For example, the piggyback data may include any issues with the network connection, internal counters, or other errors.

At step 824, the CPU software 102 may read the specified memory address to determine the commands that have been executed. For example, the head register read module 106c may poll the memory address 506 for an updated value of the data chunk 508. The head register read module 106c may read the data chunk 508 upon detecting an update in any portion of the data chunk 508. For example, the data chunk 508 may be updated due to an updated value of the CQ head register 220 or the piggyback data. The head register read module 106c may first attempt to read a cache line corresponding to the data chunk 508 from the cache 104 using the tag 514. If the data chunk 508 is not in the cache 104, the head register read module 106c may read the data chunk from the main memory 108. In either case, the latency to read the cache 104 or the main memory 108 may be much smaller than reading the CQ head register 220 off of the I/O bus 120. Thus, the performance of the CPU 102 can be improved by accessing the cache 104 or the main memory 108 instead of the I/O controller 200 to read the CQ head register 220. This can allow the CPU 102 to process more commands in the same duration.

At step 826, the CPU software 102 may read the CQ entry for the command that has been executed. For example, the CQ entry read module 106d may read the CQ entry for the command that has been executed to determine whether the command was completed successfully. The command ID 306e read from the CQ entry can be correlated with the command ID 302a for the submitted command. Based on the status code 306d, the CQ entry read module 106d can determine whether the command has been successfully completed or an error was encountered during the execution of the command so that an appropriate action may be taken. The SQ head index 306b may indicate a current value of the SQ head index 314 indicating the number of entries that have been fetched by the I/O controller 200 from the SQ 212 for execution so those entries may be available for re-use by the CPU software 106.

Figure 9:
FIG. 9 illustrates a flow chart for a method to reflect contents of a hardware register in a memory associated with a host processor, according to certain embodiments.
Figure 9:
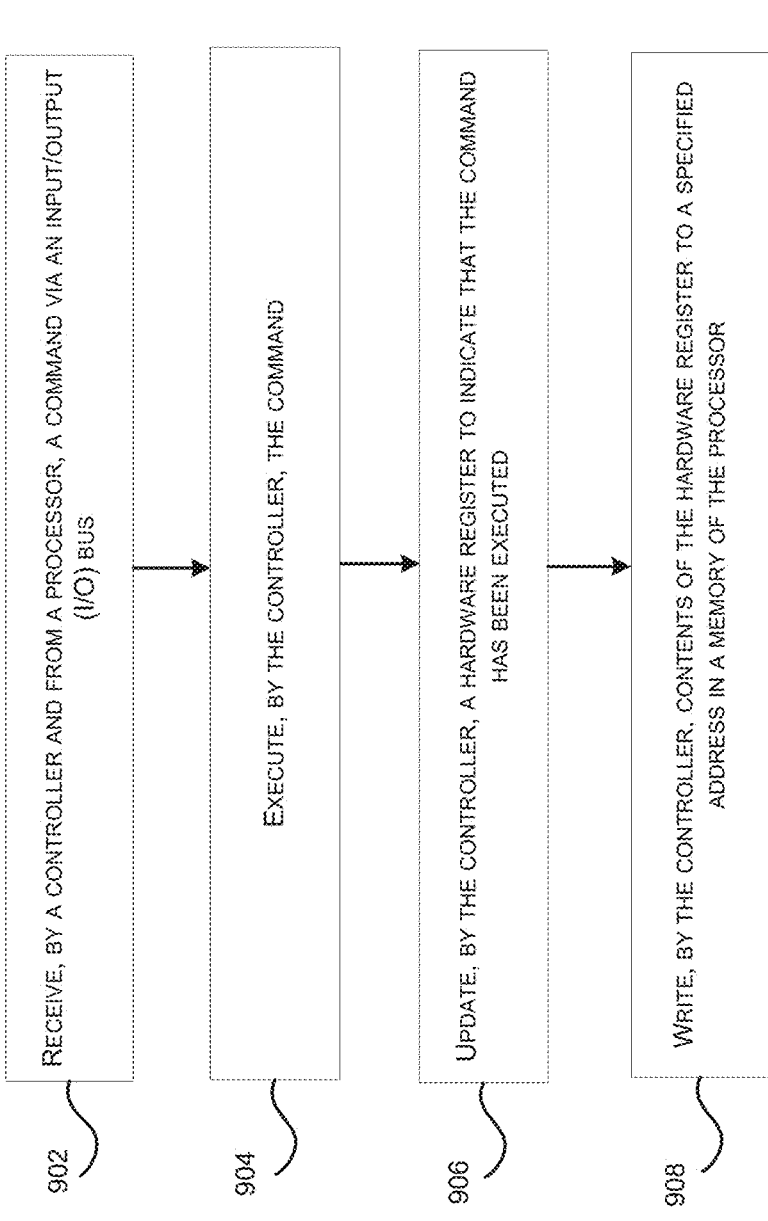

FIG. 9 illustrates a flow chart 900 for a method to reflect contents of a hardware register in a memory associated with a processor, according to certain embodiments. The processor may be the host processor 502 in FIG. 5. The method may be executed by the CPU 102 and one of the I/O devices 116 as shown in FIG. 1. The I/O device 116 may be the I/O controller 200 of FIG. 2. The CPU 102 may be coupled to the I/O controller 200 on the I/O bus 120 via the Northbridge 110 and the Southbridge 112. The bus 114 connecting the Northbridge 110 and the Southbridge 112 may be an internal bus, a PCIe bus, or a suitable peripheral bus. The I/O controller 200, CPU 102, and the memory 108 may be part of an apparatus. The I/O controller 200 can be a network controller, a crypto-engine, an AI engine, a storage memory controller, or an audio device controller, among others.

At step 902, a controller may receive a command from a processor via an I/O bus. Receiving the command may include receiving an update to an SQ tail index for an SQ. For example, the CPU software 106 executing on the host processor 502 may send a command to the I/O controller 200 coupled to the host processor 502 via the I/O bus 120. As discussed with reference to FIG. 1, the host processor 502 may be coupled to the I/O controller 200 via the Northbridge 110 and the Southbridge 112. Sending the command by the CPU software 106 may include submitting an entry for the command in the SQ 212 based on the SQ tail index 304. The SQ tail index 304 may identify a next available entry in the SQ 212. Update to the SQ tail index 304 may be performed by the host processor 502 by writing to the SQ tail doorbell register 218 after submitting the entry for the command in the SQ 212. The entry submitted by the CPU software 106 may be similar to the SQ entry 302. As shown in FIG. 4, the SQ entry may include a unique command ID 302a to identify the command, command opcode 302d to indicate the type of command, and the command metadata 302b for additional information associated with the command. For example, the command opcode 302d may indicate a DMA operation and the command metadata 302b may include descriptors for the DMA operation.

Prior to sending the command, the CPU software 106 may specify the address in the memory to be written by the I/O controller 200. As discussed with reference to FIG. 5, the CPU software 106 may specify the memory address 506 in the main memory 108 to be written by the I/O controller 200 with the updated data chunk 508. For example, the configuration module 106a may write the configuration register 222 with the memory address 506 to be used by the I/O controller 200 for writing the updated data chunk 508 to the main memory 108.

At step 904, the controller may execute the command. The command execution module 204b in the I/O controller 200 may execute the command based on the command opcode 302d and the associated command metadata 302b in the submitted SQ entry. For example, the command execution module 204b may perform the DMA operation between the source address and the destination address based on the DMA descriptor in the command metadata 302b. In some examples, the command may finish execution unsuccessfully.

At step 906, the controller may update a hardware register to indicate that the command has been executed. The CQ interface module 204c may update the CQ head register 220 to indicate that the command has been executed. Updating the CQ head register 220 may include submitting a corresponding entry in the CQ 214 upon executing the command, expiration of a timer or reaching a threshold value, and updating the CQ head index 308 in the CQ head register 220 upon submitting the corresponding entry. The CQ head index 308 may identify the command that has been executed by pointing to an index for the processed commands in the ring.

At step 908, the controller may write contents of the hardware register to a specified address in a memory of the processor. The memory update module 204d may write contents of the CQ head register 220 to the specified address 506 in the main memory 108. The contents of the CQ head register 220 may be written as the first portion 508a of the data chunk 508 in the main memory 108. The memory update module 204d may also write piggyback data, which is unrelated to the command, to the specified address 506 in the main memory 108 as the second portion 508b of the data chunk 508. The piggyback data may be unrelated to the command executed by the I/O controller 200 (e.g., data that is not involved with the execution of the command), and may include data which may be relevant to the CPU software 106 for other tasks. For example, the piggyback data may include any issues with the network connection or other errors.

The software executing on the host processor may read the specified address in the memory instead of the hardware register to determine whether the command has been executed. For example, the head register read module 106c may poll the memory address 506 for an updated value of the data chunk 508 to determine whether the command has been executed. The head register read module 106c may read the data chunk 508 upon detecting an update in any portion of the data chunk 508. For example, the data chunk 508 may be updated due to an updated value of the CQ head register 220 or the piggyback data. The head register read module 106c may first attempt to read the data chunk 508 from the cache 104 using the tag 514. If the data chunk 508 is not in the cache 104, the head register read module 106c may read the data chunk 508 from the main memory 108. In either case, the latency to read the data chunk 508 may be much smaller than reading the CQ head register 220 off of the I/O bus 120. Thus, the performance of the CPU 102 can be improved by accessing the main memory 108 or the cache 104 instead of the I/O controller 200 to read the CQ head register 220. This can allow the CPU 102 to process more commands in the same duration.

The CPU software 106 may read the entry in the CQ 214 to determine whether the command was executed successfully based on the status code. For example, the CQ entry read module 106d may read the CQ entry for the command that has been executed to determine whether the command was completed successfully. The command ID 306e read from the CQ entry can be correlated with the command ID 302a for the submitted command. Based on the status code 306d, the CQ entry read module 106d can determine whether the command has been successfully completed or an error was encountered during the execution of the command so that an appropriate action may be taken. The SQ head index 306b may indicate a current value of the SQ head index 314 indicating the number of entries that have been fetched by the I/O controller 200 from the SQ 212 for execution so those entries may be available for re-use by the CPU software 106 to submit new commands.

Figure 10:
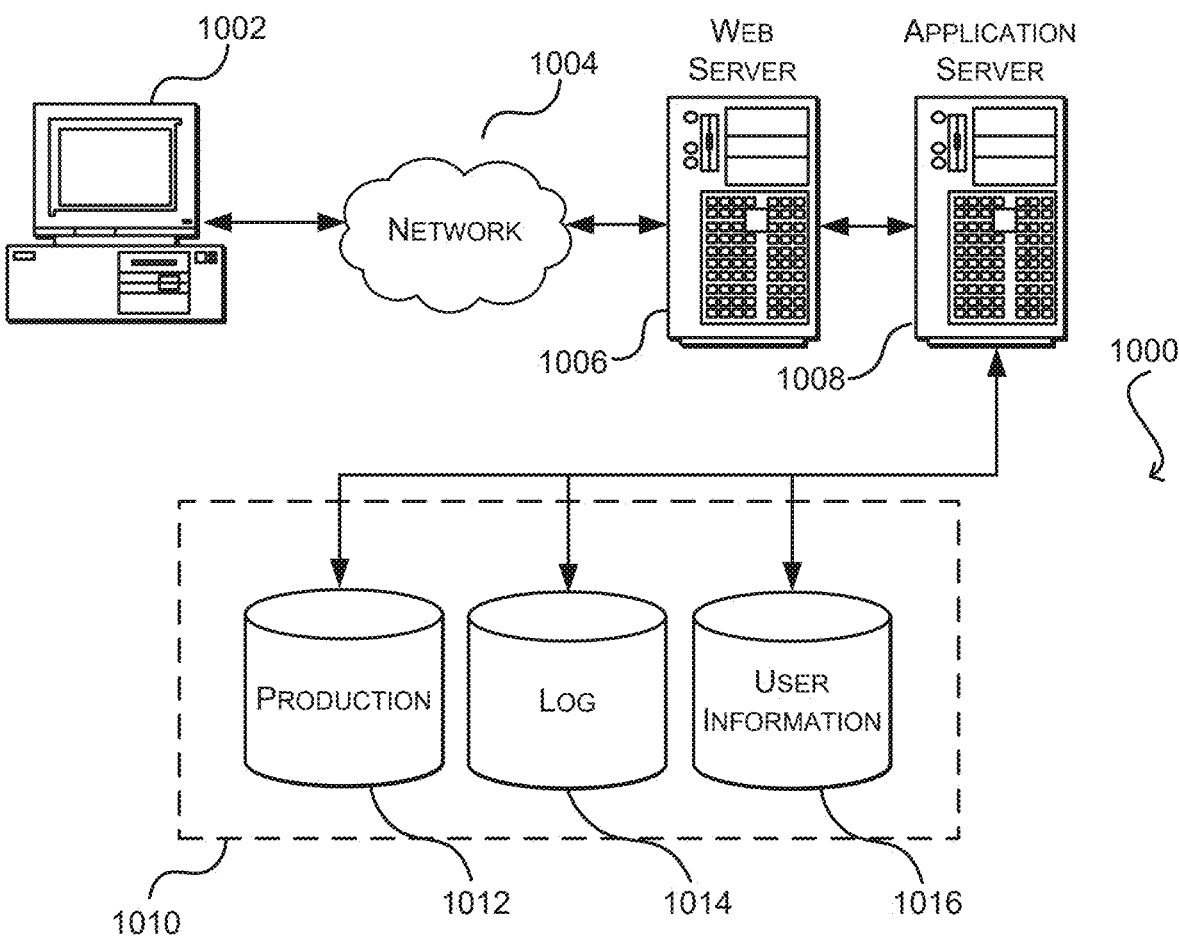
FIG. 10 illustrates an example environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, access- ing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in coop- eration with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein. In various embodiments, the computer system 100 of FIG. 1, or other components or functionalities discussed with reference to FIGS. 1-9 can be part of the electronic client device 1002, the web server 1006, or the application server 1008.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) stor- ing instructions that, when executed by a processor of the server, allow the server to perform its intended functions. Suitable implementations for the operating system and gen- eral functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal com- puters, such as desktop or laptop computers running a standard operating system, as well as cellular, wireless, and handheld devices running mobile software and capable of supporting a number of networking and messaging proto- cols. Such a system also can include a number of worksta- tions running any of a variety of commercially-available operating systems and other known applications for pur- poses such as development and database management. These devices also can include other electronic devices, such as dummy terminals, thin-clients, gaming systems, and other devices capable of communicating via a network.

Most embodiments utilize at least one network that would be familiar to those skilled in the art for supporting com- munications using any of a variety of commercially-avail- able protocols, such as Transmission Control Protocol/In- ternet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra- red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be imple- mented as one or more scripts or programs written in any programming language, such as Java®, C, C#, or C++, or any scripting language, such as Perl, Python, or TCL, as well as combinations thereof. The server(s) may also include database servers, including without limitation those com- mercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the infor- mation may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:

configuring, by a host processor, a queue for an input/output (I/O) controller, the queue located in a memory of the I/O controller;

specifying, by the host processor, a memory address for updates by the I/O controller, the memory address located in a main memory connected to the host processor;

submitting, by the host processor, an entry in the queue for a command to be executed by the I/O controller; and reading, by the host processor, the memory address, instead of a hardware register located in the I/O controller, to determine that the command has been executed by the I/O controller, wherein the I/O controller is configured to, in response to executing the command, write contents of the hardware register into the memory address.

2. The method of claim 1, further comprising:
updating, by the host processor, a tail index for the queue upon submitting the entry in the queue.

3. The method of claim 2, further comprising:
writing, by the host processor, the updated tail index for the queue in a doorbell register.

4. The method of claim 3, wherein the doorbell register is located in the I/O controller.

5. The method of claim 1, wherein the queue is a submission queue, and wherein the method further comprises:
configuring, by the host processor, a completion queue for the I/O controller, the completion queue located in the memory of the I/O controller.

6. The method of claim 5, wherein the submission queue and the completion queue are circular buffers in a same ring.

7. The method of claim 5, wherein the submission queue and the completion queue are mapped in an address space of the host processor.

8. A system comprising:
a host processor;
a main memory connected to the host processor; and
an input/output (I/O) controller coupled to the host processor via an I/O bus, the I/O controller having a memory;
wherein the host processor is configured to execute instructions to:
configure a queue for the I/O controller, the queue located in the memory of the I/O controller;
specify a memory address for updates by the I/O controller, the memory address located in the main memory;
submit an entry in the queue for a command to be executed by the I/O controller; and
read the memory address, instead of a hardware register located in the I/O controller, to determine that the command has been executed by the I/O controller, wherein the I/O controller is configured to, in response to executing the command, write contents of the hardware register into the memory address.

9. The system of claim 8, wherein the host processor is further configured to:
update a tail index for the queue upon submitting the entry in the queue.

10. The system of claim 9, wherein the host processor is further configured to:
write the updated tail index for the queue in a doorbell register.

11. The system of claim 10, wherein the doorbell register is located in the I/O controller.

12. The system of claim 8, wherein the queue is a submission queue, and wherein the host processor is further configured to:
configure a completion queue for the I/O controller, the completion queue located in the memory of the I/O controller.

13. The system of claim 12, wherein the submission queue and the completion queue are circular buffers in a same ring.

14. The system of claim 12, wherein the submission queue and the completion queue are mapped in an address space of the host processor.

15. A non-transitory computer-readable medium comprising instructions that, when executed by a host processor, cause the host processor to perform operations comprising:
configuring, by the host processor, a queue for an input/output (I/O) controller, the queue located in a memory of the I/O controller;
specifying, by the host processor, a memory address for updates by the I/O controller, the memory address located in a main memory connected to the host processor;
submitting, by the host processor, an entry in the queue for a command to be executed by the I/O controller; and
reading, by the host processor, the memory address, instead of a hardware register located in the I/O controller, to determine that the command has been executed by the I/O controller, wherein the I/O controller is configured to, in response to executing the command, write contents of the hardware register into the memory address.

16. The non-transitory computer-readable medium of claim 15, wherein the operations further comprise:
updating, by the host processor, a tail index for the queue upon submitting the entry in the queue.

17. The non-transitory computer-readable medium of claim 16, wherein the operations further comprise:
writing, by the host processor, the updated tail index for the queue in a doorbell register.

18. The non-transitory computer-readable medium of claim 17, wherein the doorbell register is located in the I/O controller.

19. The non-transitory computer-readable medium of claim 15, wherein the queue is a submission queue, and wherein the operations further comprise:
configuring, by the host processor, a completion queue for the I/O controller, the completion queue located in the memory of the I/O controller.

20. The non-transitory computer-readable medium of claim 19, wherein the submission queue and the completion queue are circular buffers in a same ring, and wherein the submission queue and the completion queue are mapped in an address space of the host processor.

* * * * *